(12) United States Patent
Mitsunobu et al.

(10) Patent No.: US 11,965,250 B2
(45) Date of Patent: Apr. 23, 2024

(54) HOT STAMPED STEEL

(71) Applicant: NIPPON STEEL CORPORATION, Tokyo (JP)

(72) Inventors: Takuya Mitsunobu, Tokyo (JP); Kohei Tokuda, Tokyo (JP); Takehiro Takahashi, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/636,486

(22) PCT Filed: Aug. 28, 2020

(86) PCT No.: PCT/JP2020/032646
§ 371 (c)(1),
(2) Date: Feb. 18, 2022

(87) PCT Pub. No.: WO2021/039973
PCT Pub. Date: Mar. 4, 2021

(65) Prior Publication Data
US 2022/0298646 A1 Sep. 22, 2022

(30) Foreign Application Priority Data
Aug. 29, 2019 (JP) .................................. 2019-157206

(51) Int. Cl.
*C23C 30/00* (2006.01)
*C22C 18/04* (2006.01)
(Continued)

(52) U.S. Cl.
CPC ............ *C23C 30/005* (2013.01); *C22C 18/04* (2013.01); *C22C 22/00* (2013.01); *C22C 30/02* (2013.01); *C22C 30/04* (2013.01); *C22C 30/06* (2013.01)

(58) Field of Classification Search
CPC ......... C22C 18/04; C22C 22/00; C22C 30/06; C22C 18/00; C21D 8/0278; C21D 8/0478
See application file for complete search history.

(56) References Cited

U.S. PATENT DOCUMENTS

| | | | |
|---|---|---|---|
| 2011/0303328 A1 | 12/2011 | Kondo et al. | |
| 2014/0057130 A1 | 2/2014 | Flechtner | |

(Continued)

FOREIGN PATENT DOCUMENTS

| | | |
|---|---|---|
| JP | 2010/180428 A | 8/2010 |
| JP | 2012-112010 A | 6/2012 |

(Continued)

*Primary Examiner* — Anthony M Liang
*Assistant Examiner* — Jacob J Gusewelle
(74) *Attorney, Agent, or Firm* — Renner, Otto, Boisselle & Sklar, LLP

(57) ABSTRACT

A hot stamped steel includes a base material, a plated layer that is formed on a surface of the base material, and an oxide film that is formed on a surface of the plated layer; chemical composition of the plated layer contains 20.00 to 45.00 mass % of Al, 10.00 to 45.00 mass % of Fe, 4.50 to 15.00 mass % of Mg, 0.10 to 3.00 mass % of Si, 0.05 to 3.00 mass % of Ca, 0 to 0.50 mass % of Sb, 0 to 0.50 mass % of Pb, 0 to 1.00 mass % of Cu, 0 to 1.00 mass % of Sn, 0 to 1.00 mass % of Ti, 0 to 0.50 mass % of Sr, 0 to 1.00 mass % of Cr, 0 to 1.00 mass % of Ni, and 0 to 1.00 mass % of Mn with a remainder of Zn and impurities; and chemical composition of the oxide film contains 20.0 to 55.0 at % of Mg, 0.5 to 15.0 at % of Ca, 0 to 15.0 at % of Zn, and 0 at % or more and less than 10.0 at % of Al with a remainder of O and a total of 5.0 at % or less of impurities, and the adhesion amount of the oxide film per one surface is in a range of 0.01 to 10 $g/m^2$.

4 Claims, 1 Drawing Sheet

(51) Int. Cl.
 *C22C 22/00* (2006.01)
 *C22C 30/02* (2006.01)
 *C22C 30/04* (2006.01)
 *C22C 30/06* (2006.01)

(56) References Cited

U.S. PATENT DOCUMENTS

| | | |
|---|---|---|
| 2017/0002450 A1 | 1/2017 | Kim et al. |
| 2020/0002798 A1 | 1/2020 | Tokuda et al. |
| 2020/0032360 A1 | 1/2020 | Sengoku et al. |
| 2020/0189233 A1 | 6/2020 | Suzuki et al. |

FOREIGN PATENT DOCUMENTS

| | | | |
|---|---|---|---|
| JP | 2012112010 A | * | 6/2012 |
| JP | 2014-514436 A | | 6/2014 |
| JP | 2017-066459 A | | 4/2017 |
| JP | 2017066459 A | * | 4/2017 |
| TW | 201739935 A | | 11/2017 |
| WO | 2015/099399 A1 | | 7/2015 |
| WO | 2018/139620 A1 | | 8/2018 |
| WO | 2018/179395 A1 | | 10/2018 |
| WO | 2018/221738 A1 | | 12/2018 |

* cited by examiner

HOT STAMPED STEEL

TECHNICAL FIELD OF THE INVENTION

The present invention relates to a hot stamped steel.

Priority is claimed on Japanese Patent Application No. 2019-157206, filed Aug. 29, 2019, the content of which is incorporated herein by reference.

BACKGROUND ART

In recent years, the inhibition of the consumption of a chemical fuel has been requested for the protection of environment and the prevention of global warming. Such a request is no exception to, for example, vehicles that are indispensable for daily life and activities as transportation. Regarding such a request, the improvement of fuel efficiency and the like obtained from a reduction in the weight of a vehicle body has been examined for a vehicle. Since most of the structure of a vehicle is formed of iron, particularly, a steel sheet, reducing the thickness of the steel sheet to reduce weight is very effective in terms of reducing the weight of the vehicle body. However, since the strength of a structure is reduced in a case where the thickness of the steel sheet is simply reduced to reduce the weight of the steel sheet, there is a concern that safety is reduced. For this reason, in order to reduce the thickness of the steel sheet, it is necessary to increase the mechanical strength of the steel sheet to be used so that the strength of the structure is not reduced.

Accordingly, a steel sheet, of which the mechanical strength can be maintained or increased due to an increase in the mechanical strength of the steel sheet even though the steel sheet is made to be thinner than the steel sheet having been used in the past, has been researched and developed. There is a request for such a steel sheet not only in a vehicle manufacturing industry but also in various manufacturing industries.

In general, a material having a high mechanical strength tends to have low shape fixability in forming, such as bending. For this reason, in a case where this material is to be worked into a complicated shape, the working of the material is difficult. Examples of one of methods of solving a problem about formability include so-called "a hot pressing method (a hot stamping method, a high-temperature, pressing method, and a die quenching method)". In this hot pressing method, a material, which is an object to be formed, is heated to a high temperature once, and the material softened by heating is cooled after being formed by press working or is cooled simultaneously with forming.

According to this hot pressing method, since a material is heated to a high temperature once to be softened and press working is performed in a state where the material is softened, press working can be easily performed on the material. Accordingly, a press-formed article, which has both good shape fixability and high mechanical strength, is obtained by this hot press working. In particular, in a case where the material is steel, the mechanical strength of the press-formed article can be increased by a quenching effect obtained from cooling performed after forming.

However, in a case where this hot pressing method is applied to a steel sheet, the steel sheet is heated to a high temperature of, for example, 800° C. or higher, so that iron and the like of the surface of the steel sheet are oxidized and scales (oxides) are generated. Accordingly, since a step of removing the scales (descaling step) is required after hot press working is performed, productivity is reduced. Further, in a member and the like requiring corrosion resistance, antirust treatment or metal coating needs to be performed on the surface of the member after working. For this reason, a surface cleaning step and a surface treatment step are required, so that productivity is reduced as well.

A method of performing coating, such as plating, on a steel sheet, which is not yet subjected to hot stamping, to improve corrosion resistance and to omit a descaling step is considered as an example of a method of inhibiting such a reduction in productivity.

A plated steel sheet for hot pressing, which includes an Al—Zn-based alloy plating layer formed on the surface of a steel sheet and containing 20 to 95 mass % of Al, 0.01 to 10 mass % of Ca+Mg, and Si, is disclosed in, for example, Patent Document 1 as such a plated steel material. According to Patent Document 1, it is disclosed that the production of scales is inhibited during heating performed before hot pressing, plating does not adhere to dies during hot pressing, and a hot-pressed member to be obtained has good appearance and has excellent coating adhesion and excellent corrosion resistance.

Further, Patent Document 2 discloses a steel sheet product including a base layer that is provided to be formed on a component by hot pressing, is coated with a metal protective coating made of Zn or a Zn alloy to protect the base layer from corrosion, and is made of steel. At least one of free surfaces of the steel sheet product is coated with an individual cover layer containing an individual cover layer containing the oxide, the nitride, the sulfide, the carbide, the hydrate, or the phosphate compound of base metal.

Furthermore, Patent Document 3 discloses a plated steel material which includes a plated layer formed on the surface of a steel material and including an Al—Fe alloy layer and a Zn—Mg—Al alloy layer and of which corrosion resistance is dramatically improved.

Members obtained by hot stamping the above-mentioned steer material are often applied, to vehicle components, and these members are generally adhesively bonded in a case where these members are applied as vehicle components. However, the adhesiveness of the hot stamped steel is not examined at all in Patent Documents 1 to 3.

As a result of examination performed by the inventors, it has been found that there is a case where adhesiveness (adhesive durability) cannot be ensured in a case where a member obtained by hot stamping a steel sheet including a plated layer containing Al or Zn is subjected to general adhesive bonding for vehicle.

PRIOR ART DOCUMENT

Patent Document

[Patent Document 1] Japanese Unexamined Patent Application, First Publication No. 2012-112010
[Patent Document 2] Published Japanese Translation No. 2014-514436 of the PCT International Publication
[Patent Document 3] Japanese Unexamined Patent Application, First Publication No. 2017-66459

DISCLOSURE OF THE INVENTION

Problems to be Solved by the Invention

The invention has been made in consideration of the above-mentioned problem. An object of the invention is to provide a hot stamped steel that has excellent adhesiveness.

Means for Solving the Problem

The inventors found that a hot stamped steel excellent in adhesiveness is obtained in a case where the composition balance of a plated layer of a hot-dip Zn—Al—Mg-plated steel sheet and conditions during the manufacture thereof are controlled to form an oxide film, which contributes to the improvement of adhesiveness, on the plated layer.

The invention has been completed on the basis of the above-mentioned knowledge, and the gist thereof is as follows.

(1) A hot stamped steel according to an aspect of the invention includes a base material that is formed of steel, a plated layer that is formed on a surface of the base material, and an oxide film that is formed on a surface of the plated layer. Chemical composition of the plated layer contains 20.00 to 45.00 mass % of Al, 10.00 to 45.00 mass % of Fe, 4.50 to 15.00 mass % of Mg, 0.10 to 3.00 mass % of Si, 0.05 to 3.00 mass % of Ca, 0 to 0.50 mass % of Sb, 0 to 0.50 mass % of Pb 0 to 1.00 mass % of Cu, 0 to 1.00 mass % of Sn, 0 to 1.00 mass % of Ti, 0 to 0.50 mass % of Sr, 0 to 1.00 mass % of Cr, 0 to 1.00 mass % of Ni, and 0 to 1.00 mass % of Mn with a remainder of Zn and impurities. Chemical composition of the oxide film contains 20.0 to 55.0 at % of Mg, 0.5 to 15.0 at % of Ca, 0 to 15.0 at % of Zn, and 0 at % or more and less than 10.0 at % of Al with a remainder of O and a total of 5.0 at % or less of impurities, and the adhesion amount of the oxide film per one surface is in a range of 0.01 to 10 $g/m^2$.

(2) In the hot stamped steel according to (1), the chemical composition of the plated layer may contain one or both of 25.00 to 35.00 mass % of Al and 6.00 to 10.00 mass % of Mg.

(3) In the hot stamped steel according to (1) or (2), the chemical composition of the oxide film may contain 35.0 to 55.0 at % of Mg.

Effects of the Invention

According to the aspect of the invention, it is possible to provide a hot stamped steel that has excellent adhesiveness.

EMBODIMENTS OF THE INVENTION

A hot stamped steel according to an embodiment of the invention (a hot stamped steel according to this embodiment) will be described with reference to the drawings.

Figure 1:
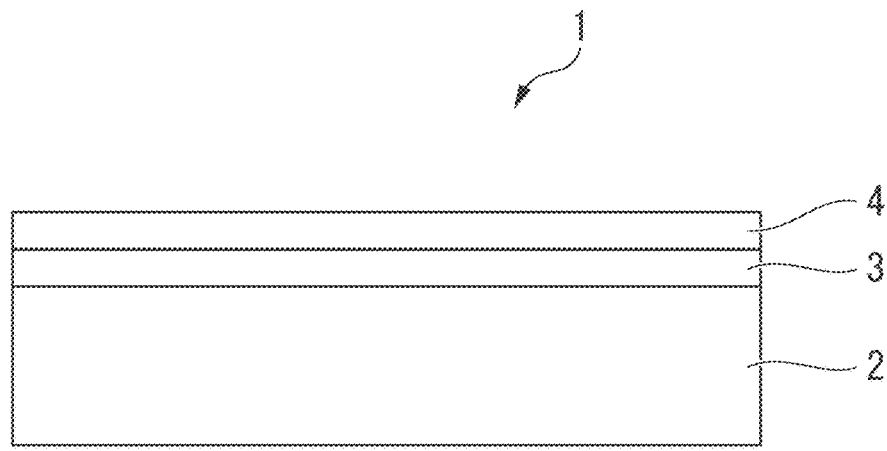
FIG. 1 is a schematic diagram showing a hot stamped steel according to an embodiment.

With reference to FIG. 1, the hot stamped steel 1 according to this embodiment includes a base material 2 that is formed of steel, a plated layer 3 that is formed on the surface of the base material 2, and an oxide film 4 that is formed on the surface of the plated layer 3. The plated layer 3 and the oxide film 4 are formed on only one surface of the base material 2 in FIG. 1, but may be formed on both surfaces thereof.

<Base Material>

The base material 2 is formed of steel. The base material 2 is, for example, a hot stamped member that is obtained by hot stamping a steel sheet. For this reason, the base material 2 has the shape of a sheet in FIG. 1 but the shape of the base material 2 is not limited.

Further, in the hot stamped steel 1 according to this embodiment, the plated layer 3 and the oxide film 4 are important and the chemical composition and the like of the base material 2 are not particularly limited. With regard to the base material 2, steel to be subjected to plating and hot stamping may be determined depending on a product to which the base material 2 is to be applied or strength, a sheet thickness, and the like to be required for the base material 2. For example, a hot-rolled steel sheet described in JIS G3193: 2008 or a cold-rolled steel sheet described in JIS G3141: 2017 can be used as the base material.

<Plated Layer>

[Chemical Composition]

Hereinafter, % related to the chemical composition of the plated layer is mass % unless otherwise noted, Al: 20.00 to 45.00%

Al is an element that is essential to improve the corrosion resistance of the plated layer 3. Further, in a case where an Al content is less than 20.00%, an intermetallic compound, which is mainly composed of Ca and Al and serves as a supply source of Ca to be supplied to the outermost surface of the plated layer during hot stamping, cannot be produced. As a result, Zn and Mg are evaporated and MgO and ZnO, which reduce adhesiveness, are formed on the surface of the plated layer, so that adhesiveness is reduced. For this reason, the Al content is set to 20.00% or more. The Al content is preferably 25.00% or more.

On the other hand, in a case where the Al content exceeds 45.00%, Al-based oxide, such as $Al_2O_3$, which reduces adhesiveness, is formed, so that adhesiveness is reduced. For this reason, the Al content is set to 45.00% or less. The Al content is preferably 35.00% or less.

Fe: 10.00 to 45.00%

Since Fe is diffused into the plated layer 3 from the base material 2 in a case where a plated steel sheet is heated during hot stamping, Fe is necessarily contained in the plated layer 3 of the hot stamped steel 1.

In a case where a Fe content is less than 10.0%, spot weldability and a deposition property tend to deteriorate. Accordingly, the Fe content is set to 10.00% or more.

On the other hand, in a case where the Fe content is excessively high, corrosion resistance tends to deteriorate. For this reason, the Fe content is set to 45.00% or less.

Mg: 4.50 to 15.00%

Mg is an element that contributes to the improvement of the corrosion resistance of the plated layer 3. Further, since Mg is combined with a Zn component contained in the plated layer 3 and prevents liquid Zn from being generated during the heating of hot stamping, Mg also has an effect of inhibiting LME cracks. Furthermore, in the hot stamped steel 1 according to this embodiment, Mg is an element that forms the oxide film 4 and improves adhesiveness. In order to obtain these effects, the Mg content is set to 4.50% or more. In a case where the Mg content is less than 4.50%, the amount of Al-based oxide, which reduces adhesiveness, is increased in the oxide film 4. The Mg content is preferably 6.00% or more.

On the other hand, in a case where the Mg content exceeds 15.00%, sacrificial protection works excessively. As a result, the corrosion resistance of the plated layer 3 tends to be reduced. Further, the oxide film 4 is embrittled, so that adhesiveness is reduced. For this reason, the Mg content is set to 15.00% or less. The Mg content is preferably set to 10.00% or less.

Si: 0.10 to 3.00%

Si is an element that forms a compound together with Mg and contributes to the improvement of corrosion resistance.

Further in a case where the Si content is less than 0.10%, Zn and Mg are evaporated during hot stamping and MgO and ZnO, which reduce adhesiveness, are formed on the surface of the plated layer, so that adhesiveness is reduced. For this reason, the Si content is set to 0.10% or more.

On the other hand, even though the Si content exceeds 3.00%, Zn and Mg are evaporated during hot stamping and MgO and ZnO, which reduce adhesiveness, are formed on the surface of the plated layer, so that adhesiveness is reduced. For this reason, the Si content is set to 3.00% or less.

Ca: 0.05 to 3.00%

Ca is an element that improves adhesiveness in a case where Ca is contained in the oxide film 4 together with Mg. In a case where the Ca content is less than 0.05%, Zn and Mg are evaporated during hot stamping and MgO and ZnO, which reduce adhesiveness, are formed on the surface of the plated layer, so that adhesiveness is reduced. For this reason, the Ca content is set to 0.05% or more.

On the other hand, even though the Ca content exceeds 3.00%, Zn and Mg are evaporated during hot stamping and MgO and ZnO, which reduce adhesiveness, are formed on the surface of the plated layer, so that adhesiveness is reduced. For this reason, the Ca content is set to 3.00% or less.

Basically, the plated layer 3 of the hot stamped steel 1 according to this embodiment contains the above-mentioned elements with a remainder of Zn and impurities.

However, the plated layer 3 may contain Sb, Pb, Cu, Sn, Ti, Sr, Cr, Ni, and Mn in the following ranges in addition to the above-mentioned elements. Since these elements do not necessarily need to be contained, the lower limits of the amounts thereof are 0%. Further, it is preferable that the total amount of these elements is 5.00% or less.

Sb: 0 to 0.50%
Pb: 0 to 0.50%
Cu: 0 to 1.00%
Sn: 0 to 1.00%
Ti: 0 to 1.00%

Sb, Pb, Cu, Sn, and Ti are substituted with Zn in the plated layer 3 and form a solid solution in $MgZn_2$ phase. However, as long as Sb, Pb, Cu, Sn, and Ti are in predetermined amount ranges, Sb Pb, Cu, Sn, and Ti do not adversely affect the properties of the hot stamped steel 1. Accordingly, these elements may be contained in the plated layer 3. However, in a case where the amounts of the respective elements are excessive, the oxides of these elements are precipitated during the heating of hot stamping and the surface properties of the hot stamped steel 1 deteriorate, so that adhesiveness tends to be reduced. Further, in a case where the Pb content and the Sn content are excessive, a deposition property and LME resistance also deteriorate.

For this reason, each of the Sb content and the Pb content is set to 0.50% or less and each of the Cu content, the Sn content, and the Ti content is set to 1.00% or less. The Sb content and the Pb content are preferably set to 0.20% or less, and the Cu content, the Sn content, and the Ti content are preferably 0.80% or less and more preferably 0.50% or less.

Sr: 0 to 0.50%

Sr is an element that is effective to inhibit the forming of top dross formed on a plating bath during manufacturing. Further, since Sr inhibits atmospheric oxidation during the heat treatment of hot stamping, Sr is an element that inhibits a change in the color of the plated steel sheet subjected to the heat treatment. For this reason, Sr may be contained in the plated layer. In order to obtain the above-mentioned effects, it is preferable that a Sr content is set to 0.05% or more.

On the other hand, in a case where the Sr content is excessive, Sr adversely affects a coating film-swelling width and flow rust in a corrosion test. For this reason, the Sr content is set to 0.50% or less. The Sr content is preferably set to 0.30% or less and is more preferably set to 0.10% or less.

Cr: 0 to 1.00%
Ni: 0 to 1.00%
Mn: 0 to 1.00%

Cr, Ni, and Mn are concentrated near an interface between the plated layer and the base material in the plated steel sheet, and have an effect of eliminating spangles formed on the surface of the plated layer, and the like. Accordingly, one or more selected from Cr, Ni, and Mn may be contained in the plated layer. In a case where these effects are to be obtained, it is preferable that each of the Cr content, the Ni content, and the Mn content are set to 0.01% or more.

On the other hand, in a case where the contents of these elements are excessive, a coating film-swelling width and flow rust are increased, so that corrosion resistance tends to deteriorate. Accordingly, each of the Cr content, the Ni content, and the Mn content is set to 1.00% or less. Each of the Cr content, the Ni content, and the Mn content is preferably set to 0.50% or less and is more preferably set to 0.10% or less.

The chemical composition of the plated layer is measured as follows.

The plated layer is dissolved and exfoliated and the amounts of elements contained in the exfoliated plated layer are analyzed by inductively coupled plasma (ICP)-atomic emission spectrometry, so that the average composition of the plated layer is measured. With regard to the exfoliation of the plated layer, for example, the hot stamped steel is immersed in 10%-hydrochloric acid to which an inhibitor (pickling inhibitor: manufactured by ASAHI Chemicals Co., Ltd.) for inhibiting the corrosion of base material is added, and it may be determined that the dissolution is completed in a case where foaming stops.

The structure of the plated layer is not limited, but includes, for example, a Fe—Al phase, a Zn—Mg phase, and a Zn—Al—Mg phase. Further, the adhesion amount of the plated layer is not limited, but is preferably in the range of 10 to 120 g/m². The adhesion amount of the plated layer can be obtained from a change in weight before and after the plated layer is dissolved at a room temperature in the above-mentioned method.

<Oxide Film>

[The oxide film contains 20.0 to 55.0 at % of Mg, 0.5 to 15.0 at % of Ca, 0 to 15.0 at % of Zn, and 0 at % or more and less than 10.0 at % of Al with a remainder of 0 and a total of 5.0 at % or less of impurities]

Usually, an oxide mainly consisting of $Al_2O_3$ is formed on the surface (the surface of a plated layer) of a hot stamped steel obtained by hot stamping a steel that includes the plated, layer containing Al. This oxide film reduces adhesiveness.

In contrast, in the hot stamped steel 1 according to this embodiment, plating is performed by a method to be described later to control the solidification structure of the plated layer. Accordingly, the evaporation of Zn and Mg is inhibited during subsequent hot stamping and the oxide film 4 mainly composed of Ca and Mg is formed on the surface of the steel. This oxide film is excellent in adhesiveness.

In a ease where the Mg content in the oxide film is less than 20.0%, a large amount of Al is contained in the oxide, so that adhesiveness is reduced. Further, in a case where the Mg content exceeds 55.0%, adhesion between an adhesive and the oxide is rather reduced, so that adhesiveness is reduced.

Furthermore, in a case where the Ca content in the oxide film is less than 0.5%, the strength of the oxide itself is reduced, so that adhesiveness is reduced. Moreover, in a case where the Ca content exceeds 15.0%, adhesion between an adhesive and the oxide is rather reduced, so that adhesiveness, is reduced.

Further, in a case where Zn is contained in the oxide film 4 such that a Zn content exceeds 15.0%, adhesiveness is significantly reduced. For this reason, the Zn content is set to 15.0% or less. Furthermore, in a case where 10.0% or more of Al is contained in the oxide film 4, adhesiveness is significantly reduced. For this reason, the Al content is set to be less than 10.0%. Zn and Al may not be contained.

The remainder of the chemical composition of the oxide film 4 consists of O and a total of 5.0% or less of impurities.

In a case where the amount of impurity elements exceeds 5.0%, sufficient adhesiveness cannot be obtained. Examples of the impurities include Fe, Si, and C.

Figure 2:
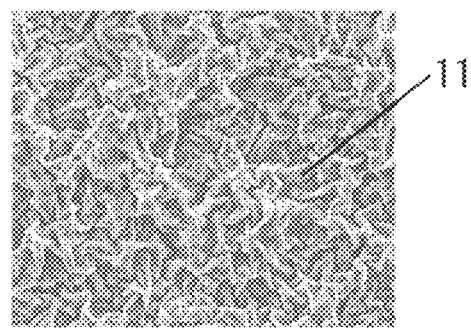
FIG. 2 is a diagram showing an example of an oxide film of the hot stamped steel according to this embodiment.

FIG. 2 shows an example of a typical SEM observation image of the oxide film formed on the surface of the hot stamped steel according to this embodiment. As shown in FIG. 2, the oxide film 4 of the hot stamped steel 1 according to this embodiment is an oxide 11 mainly containing Mg and Ca, and the Al content of the oxide is less than 10.0%. This oxide has a grain size in the range of 1 to 10 µm on a minor axis.

The chemical composition of the oxide film is obtained by dissolving the oxide film by an agent that dissolves only the oxide film without dissolving the plated layer, for example, 20%-chromic acid, analyzing a solution in which the film is dissolved by ICP-atomic emission spectrometry, and measuring the average composition of the oxide film.

[Adhesion Amount of Oxide Film Per One Surface]

The adhesion amount of the oxide film per one surface is 0.01 to 10 g/m$^2$.

In a case where the adhesion amount of the oxide film per one surface is less than 0.01 g/m$^2$, an effect of improving adhesiveness is not obtained sufficiently. On the other hand, in a case where the adhesion amount of the oxide film per one surface exceeds 10 g/m$^2$, cracks occur in the oxide layer at the time of bending or the like, which also causes a reduction in adhesiveness (exfoliation). For this reason, the adhesion amount of the oxide film per one surface is set in the range of 0.01 to 10 g/m$^2$.

In a case where the adhesion amount of the oxide film per one surface is to be obtained using a dissolution method, an opposite surface and end surfaces of the hot stamped steel other than a surface to be measured are sealed with a tape and the hot stamped steel is immersed in a dissolving solution to obtain a solution into which the oxide film formed on only one surface to be measured is exfoliated. Then, the adhesion amount of the oxide film per one surface can be obtained from a change in weight before and after dissolution.

<Manufacturing Method>

As long as the hot stamped steel according to this embodiment has the above-mentioned characteristics without depending on a manufacturing method, the effects thereof are obtained. However, according to a manufacturing method including the following steps, the hot stamped steel can be stably manufactured. Accordingly, the manufacturing method is preferable.

That is, the hot stamped steel according to this embodiment can be obtained by a manufacturing method including:
(I) a plating step of obtaining a plated steel including a plated layer by immersing a steel in a plating bath; and
(II) a hot stamping step of performing hot stamping on the plated steel subjected to the plating step, and
(III) in the plating step, the steel is cooled up to a room temperature during cooling after the immersion of the steel in the plating bath such that an average cooling rate in a temperature range of a bath temperature to 450° C. is set to 10° C./sec or higher, an average cooling rate in a temperature range of 450 to 350° C. is set to 7° C./sec or lower, and an average cooling rate in a temperature range of 350 to 150° C. is set to 4° C./sec or lower.

<Plating Step>

[Immersion in Plating Bath]

In the plating step, the steel, such as a steel sheet, used as an original sheet is immersed in the plating bath to form a plated layer on the surface of the steel.

Conditions for immersion in the plating bath are not particularly limited. For example, the surface of an original sheet to be plated is subjected to heating-reduction treatment in a temperature range of 600 to 940° C., and the steel is immersed in a plating bath having a bath temperature in the range of 500 to 750° C. for about 0.2 to 6 seconds after the steel is air-cooled using $N_2$ gas so that the temperature of the steel reaches "bath temperature+20° C.".

In a case where an immersion time is less than 0.2 seconds, the plated layer may not be sufficiently formed. On the other hand, in a case where an immersion time exceeds 6 seconds, the plated layer and the steel are excessively alloyed and a large amount of Fe is contained in the plated layer. In a case where excessive Fe is contained in the plated layer, it is difficult to inhibit the evaporation of Zn and Mg during the heating of hot stamping. For this reason, in a case where an immersion time exceeds 6 seconds, an oxide film having predetermined composition is not obtained, and the adhesiveness of the hot stamped steel is reduced.

The plating bath may be set so as to include Zn, Al, Mg, and other elements according to the composition of the target plated layer 3. For example, the plating bath includes 30.00 to 75.00% of Al, 4.00 to 17.00% of Mg, and 0.20 to 2.00% of Si, and includes optional elements desired to be contained in the plated layer as necessary with a remainder of Zn and impurities.

[Cooling]

An average cooling rate in a temperature range of a bath temperature to 450° C.: 10° C./sec or higher In a method of manufacturing the hot stamped steel according to this embodiment, the plated steel is lifted from the plating bath and is then cooled such that an average cooling rate at a temperature up to 450° C. is 10° C./sec or higher. In a case where an average cooling rate in this temperature range is set to 10° C./sec or higher, the formation of an Al oxide on the surface of the plated steel can be inhibited.

The average cooling rate, in a temperature range of 450 to 350° C.: 7° C./sec or lower After the above cooling, the plated steel is cooled such that an average cooling rate in a temperature range of 450 to 350° C. is set to 7° C./sec or lower.

In a case where a cooling rate in this temperature range is lowered to control the solidification structure, an oxide film of which the Al content is low (10 at % or less) and which contains Mg and Ca is formed on the surface of the hot stamped steel in a subsequent hot stamping step. As a result, the adhesiveness of the hot stamped steel is improved.

Further, there is a concern that Zn (zinc) is evaporated due to hot stamping in the case of a zinc-based plated layer. However, although a detailed mechanism is not apparent, an intermetallic compound containing Al, Zn, Ca, and Si having an effect of inhibiting the evaporation of Zn and Mg, which are elements having high vapor pressure, is preferentially produced near the surface of the plated layer in the solidification structure controlled as described above. Accordingly, the evaporation of Zn and Mg during the heating of subsequent hot stamping can be inhibited.

The average cooling rate in a temperature range of 350 to 150° C.: 4° C./sec or lower In a case where an average cooling rate in a temperature range of 350 to 150° C. is set to 4° C./sec or lower after the above cooling, a solid solution of Al and Zn contained in the solidification structure is separated into an Al phase and a Zn phase. Accordingly, the melting point of the plated layer is lowered and an intermetallic compound containing Al, Zn, Ca, and Si is easily moved to the surface of the plated layer, which is in a molten state, during the heating of hot stamping. As a result, since the evaporation of Zn and Mg, can be more efficiently inhibited, an oxide film containing Mg and Ca can be efficiently formed.

However, in a case where a cooling rate in a part of the temperature range is high even though an average cooling rate in a temperature range of 350 to 150° C. is 4° C./sec or lower, a preferable metallographic structure is not obtained. For this reason, it is preferable that the average cooling rate in a temperature range of 350 to 150° C. is 4° C./sec or lower, the average cooling rate in a temperature range of 350 to 250° C. is 4° C./sec or lower, and the average cooling rate in a temperature range of 250 to 150° C. is 4° C./sec or lower.

<Hot Stamping Step>

Hot stamping is performed on the plated steel (the steel including the base material and the plated layer formed on the surface of the base material) subjected to the plating step.

Conditions for hot stamping are not limited. However, for example, a method of heating a plated steel sheet to a temperature range of 750 to 1200° C., holding the plated steel sheet for 0 to 8 minutes, and then interposing the plated steel sheet between flat dies, which are at a temperature of about room temperature, and rapidly cooling the plated steel sheet can be used.

According to the manufacturing method, the hot stamped steel according to this embodiment can be obtained.

EXAMPLES

The invention will be more specifically described below using examples but is not limited to these examples.

Tables 1 to 3 show Examples disclosed in the invention. Various Zn—Al—Mg-based plating baths were prepared and were used for the heating of hot stamping. A steel sheet (containing 0.2% of C and 1.3% of Mn) having a sheet thickness of 1.6 mm was used as the original sheet to be plated. After an original sheet is cut into 100 mm×200 mm, plating was performed by a batch-type hot-dip plating test device manufactured in-house. The temperature of the sheet was measured using a thermocouple spot-welded to the central portion of the original sheet to be plated.

The surface of the original sheet to be plated was subjected to heating-reduction treatment before immersion in the plating bath at a temperature of 800° C. in a $N_2$-5% $H_2$ gas atmosphere in a furnace in which an oxygen concentration was 20 ppm or less, and the original sheet to be plated was immersed in, a plating bath having a bath temperature shown in Table 2 for about 3 seconds after the original sheet to be plated was air-cooled using $N_2$ gas so that the temperature of the sheet to be immersed reached "bath temperature+20° C.". After immersion in the plating bath, the sheet was lifted at a lifting speed of 20 to 200 mm/sec.

During lifting, the adhesion amount of the plated layer was controlled by $N_2$ wiping gas as shown in Table 2. After being lifted from the plating bath, the steel sheet was cooled to a room temperature from the temperature of the plating bath under the conditions shown in Table 2.

The heating of hot stamping and the rapid cooling using the dies were performed on the produced plated steel sheet. With regard to heating conditions, the plated steel sheet was inserted into a heating furnace having a temperature of 900° C., and was retained for 0 to 8 minutes after the temperature of the plated steel sheet reached "a temperature in the furnace—10° C.". Then, the plated steel sheet was interposed between flat dies, which were at a temperature of about room temperature, and was rapidly cooled, so that a formed article was produced.

As, a result of investigation using the above-mentioned method, the chemical composition of the plated layer subjected to hot stamping was as shown in Table 1.

With regard to No. 31, hot stamping was performed using a commercially available galvannealed steel sheet.

TABLE 1

| | | Classification Chemical composition of plated layer (mass %) | | | | | | Others | |
|---|---|---|---|---|---|---|---|---|---|
| No. | No. | Zn | Al | Mg | Si | Ca | Fe | Type | Sum |
| 1 | Comparative Example | 47.80 | 19.40 | 12.10 | 0.40 | 0.80 | 19.50 | — | 0.00 |
| 2 | Comparative Example | 53.40 | 20.60 | 4.20 | 0.20 | 1.00 | 20.60 | — | 0.00 |
| 3 | Invention Example | 46.00 | 20.00 | 12.00 | 0.40 | 1.50 | 20.00 | Ni: 0.10 | 0.10 |
| 4 | Comparative Example | 38.50 | 20.00 | 20.00 | 0.40 | 1.00 | 20.10 | — | 0.00 |
| 5 | Invention Example | 46.40 | 23.00 | 6.50 | 0.50 | 1.00 | 22.60 | — | 0.00 |
| 6 | Invention Example | 34.85 | 26.00 | 11.00 | 0.60 | 1.00 | 26.50 | Sb: 0.05 | 0.05 |
| 7 | Invention Example | 37.55 | 27.50 | 6.50 | 0.40 | 0.05 | 28.00 | — | 0.00 |
| 8 | Invention Example | 29.20 | 27.50 | 14.50 | 0.30 | 0.50 | 28.00 | — | 0.00 |
| 9 | Invention Example | 31.39 | 29.50 | 8.50 | 0.50 | 0.10 | 30.00 | Ti: 0.01 | 0.01 |
| 10 | Invention Example | 29.40 | 29.30 | 8.50 | 0.60 | 1.00 | 30.20 | Cu: 1.00 | 1.00 |
| 11 | Comparative Example | 30.37 | 30.00 | 8.50 | 0.60 | 0.03 | 30.50 | — | 0.00 |
| 12 | Comparative Example | 27.90 | 31.00 | 8.30 | 0.60 | 1.00 | 31.20 | — | 0.00 |
| 13 | Comparative Example | 28.60 | 31.00 | 8.30 | 0.60 | 1.00 | 30.50 | — | 0.00 |

TABLE 1-continued

| | | Classification Chemical composition of plated layer (mass %) | | | | | | | |
|---|---|---|---|---|---|---|---|---|---|
| | | | | | | | | Others | |
| No. | No. | Zn | Al | Mg | Si | Ca | Fe | Type | Sum |
| 14 | Comparative Example | 29.70 | 31.00 | 8.30 | 0.00 | 1.00 | 30.00 | — | 0.00 |
| 15 | Comparative Example | 28.60 | 31.00 | 8.30 | 0.60 | 1.00 | 30.50 | — | 0.00 |
| 16 | Comparative Example | 9.20 | 30.00 | 5.00 | 0.30 | 0.50 | 55.00 | — | 0.00 |
| 17 | Invention Example | 19.58 | 31.00 | 14.00 | 0.40 | 3.00 | 32.00 | Pb: 0.02 | 0.02 |
| 18 | Invention Example | 28.60 | 31.00 | 8.00 | 0.40 | 1.00 | 31.00 | — | 0.00 |
| 19 | Invention Example | 29.30 | 31.00 | 5.50 | 1.10 | 1.00 | 32.00 | Mn: 0.10 | 0.10 |
| 20 | Invention Example | 21.28 | 33.00 | 8.00 | 2.00 | 1.20 | 34.50 | Sn: 0.02 | 0.02 |
| 21 | Comparative Example | 6.80 | 29.00 | 6.00 | 0.20 | 0.50 | 57.50 | — | 0.00 |
| 22 | Comparative Example | 17.90 | 33.50 | 8.00 | 0.60 | 6.00 | 34.00 | — | 0.00 |
| 23 | Invention Example | 18.79 | 35.00 | 7.80 | 2.00 | 1.40 | 35.00 | Cr: 0.01 | 0.01 |
| 24 | Invention Example | 11.60 | 38.00 | 7.80 | 2.00 | 2.10 | 38.00 | Ni: 0.50 | 0.50 |
| 25 | Invention Example | 12.30 | 38.30 | 6.20 | 2.00 | 2.30 | 38.90 | — | 0.00 |
| 26 | Invention Example | 9.40 | 39.40 | 6.20 | 2.00 | 2.50 | 40.10 | Mn: 0.40 | 0.40 |
| 27 | Comparative Example | 8.90 | 37.10 | 9.00 | 5.50 | 1.00 | 38.50 | — | 0.00 |
| 28 | Invention Example | 14.90 | 38.30 | 4.80 | 2.00 | 1.00 | 39.00 | — | 0.00 |
| 29 | Invention Example | 2.18 | 45.00 | 4.80 | 2.00 | 1.00 | 45.00 | Sr: 0.02 | 0.02 |
| 30 | Comparative Example | 4.00 | 45.50 | 8.50 | 1.00 | 1.00 | 40.00 | — | 0.00 |
| 31 | Comparative Example | Galvannealed steel sheet | | | | | | | |

TABLE 2

| | Manufacturing method | | | | | | | |
|---|---|---|---|---|---|---|---|---|
| No. | Bath temperature (°C.) | Immersion time (sec) | Average cooling rate in temperature range of bath temperature to 450° C. (°C./sec) | Average cooling rate in temperature range of 450 to 350° C. (°C./sec) | Average cooling rate in temperature range of 350 to 250° C. (°C./sec) | Average cooling rate in temperature range of 250 to 150° C. (°C./sec) | Average cooling rate in temperature range of 350 to 150° C. (°C./sec) | Adhesion amount of plated layer per surface (g/m²) |
| 1 | 520 | 3 | 15 | 5 | 2 | 2 | 2 | 40 |
| 2 | 530 | 3 | 15 | 5 | 2 | 2 | 2 | 45 |
| 3 | 530 | 3 | 15 | 5 | 2 | 2 | 2 | 30 |
| 4 | 600 | 3 | 15 | 5 | 2 | 2 | 2 | 48 |
| 5 | 580 | 3 | 15 | 5 | 2 | 2 | 2 | 45 |
| 6 | 580 | 3 | 15 | 5 | 2 | 2 | 2 | 22 |
| 7 | 550 | 3 | 15 | 5 | 2 | 2 | 2 | 45 |
| 8 | 600 | 3 | 15 | 5 | 2 | 2 | 2 | 46 |
| 9 | 570 | 3 | 15 | 5 | 2 | 2 | 2 | 47 |
| 10 | 570 | 3 | 15 | 5 | 2 | 2 | 2 | 90 |
| 11 | 570 | 3 | 15 | 5 | 2 | 2 | 2 | 38 |
| 12 | 570 | 3 | 15 | 15 | 2 | 2 | 2 | 25 |
| 13 | 570 | 3 | 5 | 5 | 2 | 2 | 2 | 25 |
| 14 | 570 | 3 | 15 | 5 | 2 | 2 | 2 | 25 |
| 15 | 570 | 3 | 15 | 5 | 5 | 5 | 5 | 25 |
| 16 | 570 | 16 | 15 | 5 | 2 | 2 | 2 | 170 |
| 17 | 600 | 3 | 15 | 5 | 2 | 2 | 2 | 25 |
| 18 | 570 | 3 | 15 | 5 | 2 | 2 | 2 | 22 |
| 19 | 570 | 3 | 10 | 5 | 2 | 2 | 2 | 26 |
| 20 | 590 | 3 | 15 | 5 | 2 | 2 | 2 | 24 |
| 21 | 570 | 3 | 15 | 5 | 20 | 2 | 4 | 33 |
| 22 | 590 | 3 | 15 | 5 | 2 | 2 | 2 | 29 |
| 23 | 600 | 3 | 15 | 5 | 2 | 2 | 2 | 35 |
| 24 | 630 | 3 | 15 | 5 | 2 | 2 | 2 | 44 |
| 25 | 650 | 3 | 15 | 5 | 2 | 2 | 2 | 45 |
| 26 | 650 | 3 | 15 | 5 | 2 | 2 | 2 | 45 |
| 27 | 650 | 3 | 15 | 5 | 2 | 2 | 2 | 20 |
| 28 | 680 | 3 | 15 | 5 | 2 | 2 | 2 | 45 |
| 29 | 680 | 3 | 15 | 5 | 2 | 2 | 2 | 56 |
| 30 | 690 | 3 | 15 | 5 | 2 | 2 | 2 | 30 |
| 31 | Galvannealed steel sheet | | | | | | | |

<Evaluation of Oxide Film>

In order to investigate the state of the oxide formed during the heating of hot stamping, each produced sample was dissolved by 20%-chromic acid, a solution in which the oxide film was dissolved was analyzed by ICP-atomic emission spectrometry, and the average composition of the oxide film was measured. Further, the adhesion amount of the oxide film per surface was measured from a change in weight before and after dissolution. As the results, the adhesion amount of the oxide film per one surface was in the range of 0.01 to 10 g/m² in all examples except for No. 31.

The analysis results of the oxide film are shown in Table 2.

Further, each sample after hot stamping was cut into 25 mm (C direction)×15 mm (L direction) and the shape of the oxide film formed on the surface of each sample was observed using SEM. The oxide film of a hot stamped steel of Invention example consisted of an Mg—Ca-containing oxide, and the grain size of the oxide film was in the range of 1 to 10 μm on a minor axis. For example, FIG. 2 shows the SEM image (BSE image) of No. 10 of Tables 1 to 3.

Figure 3:
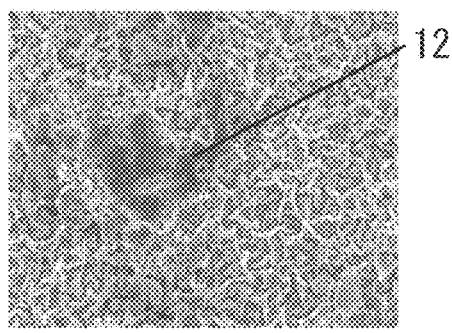
FIG. 3 is a diagram showing an example of an oxide film of a hot stamped steel of Example No. 11 (Comparative example).

Meanwhile, FIG. 3 shows the SEM image (BSE image) of Example No. 11 (Comparative example). A coarse Al-containing oxide 12 was observed in No. 11.

<Adhesiveness>

Adhesiveness was evaluated by the following method.

Two samples having a size of 100×25 mm were collected from the plated steel sheet after hot stamping, were bonded to each other after an, adhesive (Penguins cement #1066) was applied to the samples over an adhesive area of 12.5×25 mm, and were then baked at a temperature of 120° C. for 45 minutes, so that a test piece for the evaluation of adhesiveness was produced. Adhesive strength was measured using this sample by a tensile shear test. The maximum stress on a stress-strain curve, which was obtained by a tensile shear test in which a tension rate was 5 mm/min and a chuck-to-chuck distance was 112.5 mm, was taken as adhesive strength. It was evaluated that adhesiveness was more excellent as the adhesive strength was higher.

Cases where adhesive strength was in the range of 25 to 30 MPa were evaluated as "AA", cases where adhesive strength was 20 MPa or more and less than 25 MPa were evaluated as "A", and cases where adhesive strength was 15 MPa or more and less than 20 MPa were evaluated as "B".

Results are shown in Table 3.

TABLE 3

| | Oxide film | | | | | |
|---|---|---|---|---|---|---|
| No. | Mg (at %) | Ca (at %) | Al (at %) | Zn (at %) | O (at %) | Adhesiveness |
| 1 | 26.1 | 0.4 | 10.5 | 10.8 | 52.2 | B |
| 2 | 19.5 | 4.0 | 16.5 | 0.5 | 59.5 | B |
| 3 | 54.0 | 6.0 | 1.0 | 0.1 | 38.9 | A |
| 4 | 45.5 | 0.2 | 1.0 | 0.2 | 53.1 | B |
| 5 | 52.0 | 6.1 | 2.0 | 0.1 | 39.8 | A |
| 6 | 51.0 | 4.5 | 0.1 | 0.3 | 44.1 | AA |
| 7 | 48.0 | 6.5 | 0.2 | 0.1 | 45.2 | AA |
| 8 | 49.0 | 15.0 | 1.0 | 1.0 | 34.0 | A |
| 9 | 42.0 | 9.5 | 0.1 | 0.5 | 47.9 | AA |
| 10 | 48.0 | 8.2 | 0.2 | 0.1 | 43.5 | AA |
| 11 | 26.8 | 0.1 | 10.2 | 16.1 | 46.8 | B |
| 12 | 24.5 | 0.3 | 11.3 | 15.5 | 48.4 | B |
| 13 | 23.5 | 0.3 | 11.4 | 15.1 | 49.7 | B |
| 14 | 22.1 | 0.4 | 11.6 | 15.4 | 50.5 | B |
| 15 | 22.5 | 0.2 | 11.5 | 11.0 | 54.8 | B |
| 16 | 5.0 | 0.1 | 19.0 | 18.0 | 57.9 | B |
| 17 | 41.0 | 7.5 | 1.0 | 0.4 | 50.1 | A |
| 18 | 42.0 | 8.1 | 0.3 | 0.6 | 49.0 | AA |
| 19 | 46.0 | 6.5 | 3.2 | 0.8 | 43.5 | A |
| 20 | 41.0 | 8.1 | 0.1 | 0.7 | 50.1 | AA |
| 21 | 6.0 | 0.2 | 20.0 | 17.6 | 56.2 | B |
| 22 | 22.8 | 0.2 | 10.1 | 10.7 | 56.2 | B |
| 23 | 48.0 | 5.4 | 0.5 | 0.5 | 45.6 | AA |
| 24 | 42.0 | 6.5 | 0.6 | 0.4 | 50.5 | AA |
| 25 | 45.0 | 7.0 | 5.4 | 0.1 | 42.5 | A |
| 26 | 46.0 | 5.9 | 1.2 | 0.3 | 46.6 | A |
| 27 | 20.0 | 0.3 | 11.8 | 14.2 | 53.7 | B |
| 28 | 37.5 | 9.1 | 6.6 | 0.6 | 46.2 | A |
| 29 | 20.0 | 10.5 | 8.8 | 0.4 | 60.3 | A |
| 30 | 48.0 | 0.5 | 10.2 | 0.5 | 40.8 | B |
| 31 | | | Galvannealed steel sheet | | | B |

In Nos. 3, 5 to 10, 17 to 20, 23 to 26, 28, and 29 that were Invention examples, excellent adhesiveness was shown since an oxide film containing Mg and Ca, which was disclosed in the invention and, was obtained on a Zn—Al—Mg-based plating phase.

On the other hand, in Comparative examples in which the chemical composition of the plated layer was not in the range of the invention or a manufacturing method was not preferable, adhesiveness was inferior since a preferred oxide film was not obtained.

Further, adhesiveness was inferior in Comparative example using a commercially available galvannealed steel sheet.

BRIEF DESCRIPTION OF THE REFERENCE SYMBOLS

1: hot stamped steel
2: base material
3: plated layer
4: oxide film
11: Mg—Ca-containing oxide
12: Al-containing oxide

The invention claimed is:

1. A hot stamped steel comprising:
   a base material that is formed of steel;
   a plated layer that is formed on a surface of the base material; and
   an oxide film that is formed on a surface of the plated layer,
   wherein a chemical composition of the plated layer contains 20.00 to 45.00 mass % of Al, 10.00 to 45.00 mass % of Fe, 4.50 to 15.00 mass % of Mg, 0.10 to 3.00 mass % of Si, 0.05 to 3.00 mass % of Ca, 0 to 0.50 mass % of Sb, 0 to 0.50 mass % of Pb, 0 to 1.00 mass % of Cu, 0 to 1.00 mass % of Sn, 0 to 1.00 mass % of Ti, 0 to 0.50 mass % of Sr, 0 to 1.00 mass % of Cr, 0 to 1.00 mass % of Ni, and 0 to 1.00 mass % of Mn with a remainder of Zn and impurities,
   a chemical composition of the oxide film contains 20.0 to 55.0 at % of Mg, 0.5 to 15.0 at % of Ca, 0 to 15.0 at % of Zn, and 0 at % or more and less than 10.0 at % of Al with a remainder of O and a total of 5.0 at % or less of impurities, and
   an adhesion amount of the oxide film per surface area of the plated layer is in a range of 0.01 to 10 g/m$^2$.

2. The hot stamped steel according to claim 1,
   wherein the chemical composition of the plated layer contains one or both of 25.00 to 35.00 mass % of Al and 6.00 to 10.00 mass % of Mg.

3. The hot stamped steel according to claim 1,
   wherein the chemical composition of the oxide film contains 35.0 to 55.0 at % of Mg.

4. The hot stamped steel according to claim 2,
   wherein the chemical composition of the oxide film contains 35.0 to 55.0 at % of Mg.

* * * * *